C. BUISSON.
CULTIVATOR.
APPLICATION FILED AUG. 27, 1918.

1,286,931. Patented Dec. 10, 1918.

WITNESSES
R&Rousseau.

INVENTOR
Cyprian Buisson
BY
Munn &Co.
ATTORNEYS

UNITED STATES PATENT OFFICE.

CYPRIAN BUISSON, OF ST. PAUL, MINNESOTA.

CULTIVATOR.

1,286,931.     Specification of Letters Patent.     Patented Dec. 10, 1918.

Application filed August 27, 1918. Serial No. 251,669.

*To all whom it may concern:*

Be it known that I, CYPRIAN BUISSON, a citizen of the United States, and a resident of St. Paul, in the county of Ramsey and State of Minnesota, have invented certain new and useful Improvements in Cultivators, of which the following is a specification My invention is an improvement in cultivating implements, and has for its object to provide an implement of the character specified, especially adapted for cultivating and for pulling weeds at the same time, wherein means is provided for eliminating the weeds, roots and all, without cutting and without danger of cutting the growing plants.

Figure 1:
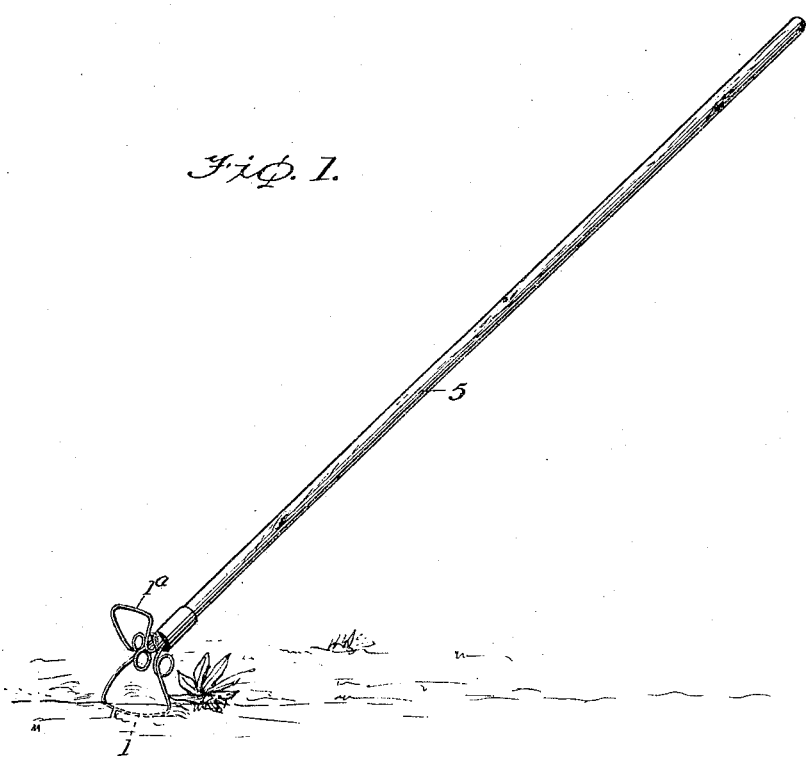
Figure 1 is a perspective view of the improved implement.

In the present embodiment of the invention, a plurality of blades is provided, each formed from wire bent to shape. Each blade is substantially yoke-shaped comprising a body 1 and 1ª, respectively and arms 2 and 2ª respectively, the bodies being curved and arranged with their convex surfaces outwardly while the arms are curved and arranged with their convex surfaces inward.

Each arm has a coil 3 at the end remote from the body, and an extension 4 beyond the coil, the said extensions being at approximately right angles to the plane of the blade. The coils 3 provide a certain amount of resiliency, and the extensions 4 are for the purpose of engaging the end of the handle 5 of wood or the like, a ferrule 6 being at the end engaged by the extensions to strengthen and reinforce the same.

Figure 2:
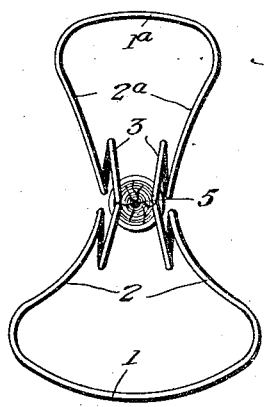
Fig. 2 is an end view of the blade or hoe detached.
Figure 3:
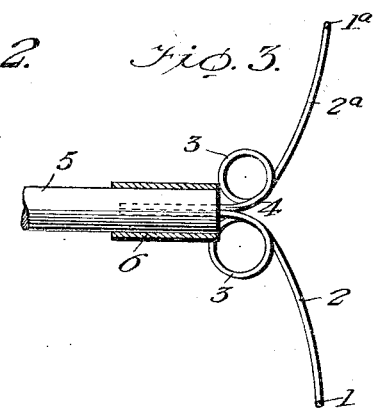
Fig. 3 is a longitudinal vertical section.

It will be noticed referring to Figs. 2 and 3 the arms 2 and 2ª of each blade are curved in two directions, namely in the plane of the blade, and in a plane at right angles to the plane of the blade.

In the operation of the usual hoe, there is a cutting action at the edge of the blade, the roots of the weeds being cut, and the root is left to sprout and furnish new weeds, being practically uninjured.

With the present invention the weed is not cut, but is torn or worked from the soil, the device being used as a drag rather than as a hoe cutting instrument. In using the improved implement, the bodies 1 and 1ª of the blades are pressed into the ground about an inch or more if necessary, near the plant which is to be weeded, and while keeping it at the same depth it is drawn along, thus pulling the weeds, roots, and all from the ground. With the improved hoe, the ground can be worked very close to the plants without either cutting or injuring the roots of the same.

I claim:

1. An implement of the character specified, comprising a handle having oppositely extending blades of different sizes, each blade being a skeleton frame of yoke shape, consisting of a body and arms, the arms being connected to the handle, and a resilient coil being interposed between each arm and the handle.

2. An implement of the character specified, comprising a blade formed of wire bent to substantially U-shape and comprising a body and arms, and a handle connected to the arms, the body being approximately circular in cross section.

CYPRIAN BUISSON.

Witnesses:
J. P. KYLE,
LILLIAN BUISSON.

Copies of this patent may be obtained for five cents each, by addressing the "Commissioner of Patents, Washington, D. C."